May 27, 1947.  E. E. LAKSO  2,421,097
PROCESS AND APPARATUS FOR REPAIR OF TIRES
Filed Oct. 28, 1943   2 Sheets—Sheet 1
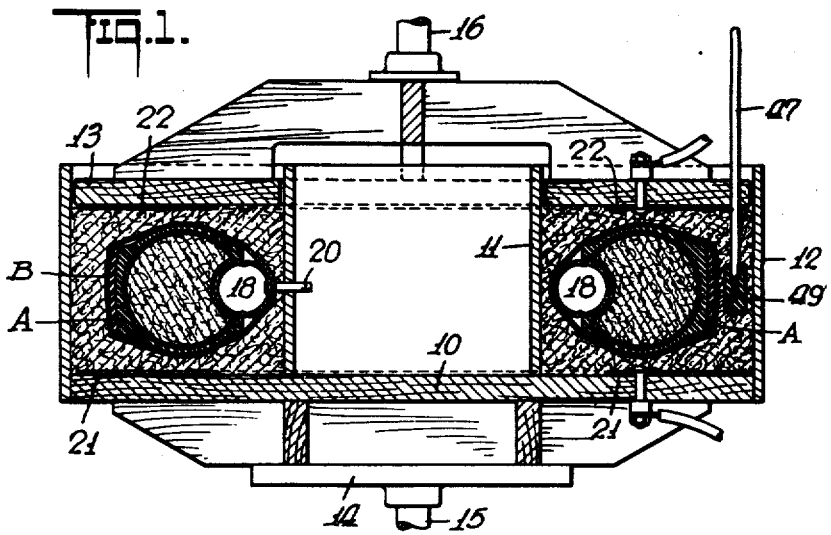
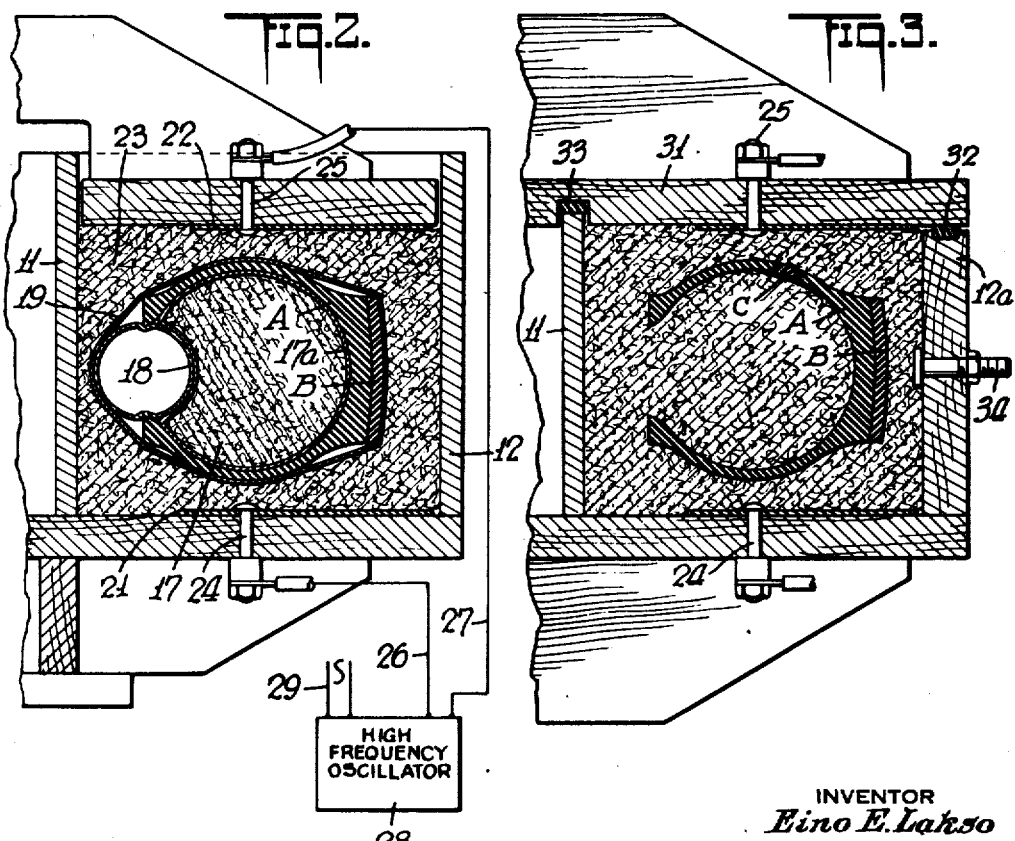
INVENTOR
*Eino E. Lakso*
BY
*Dean Fairbank & Hirsch*
ATTORNEYS

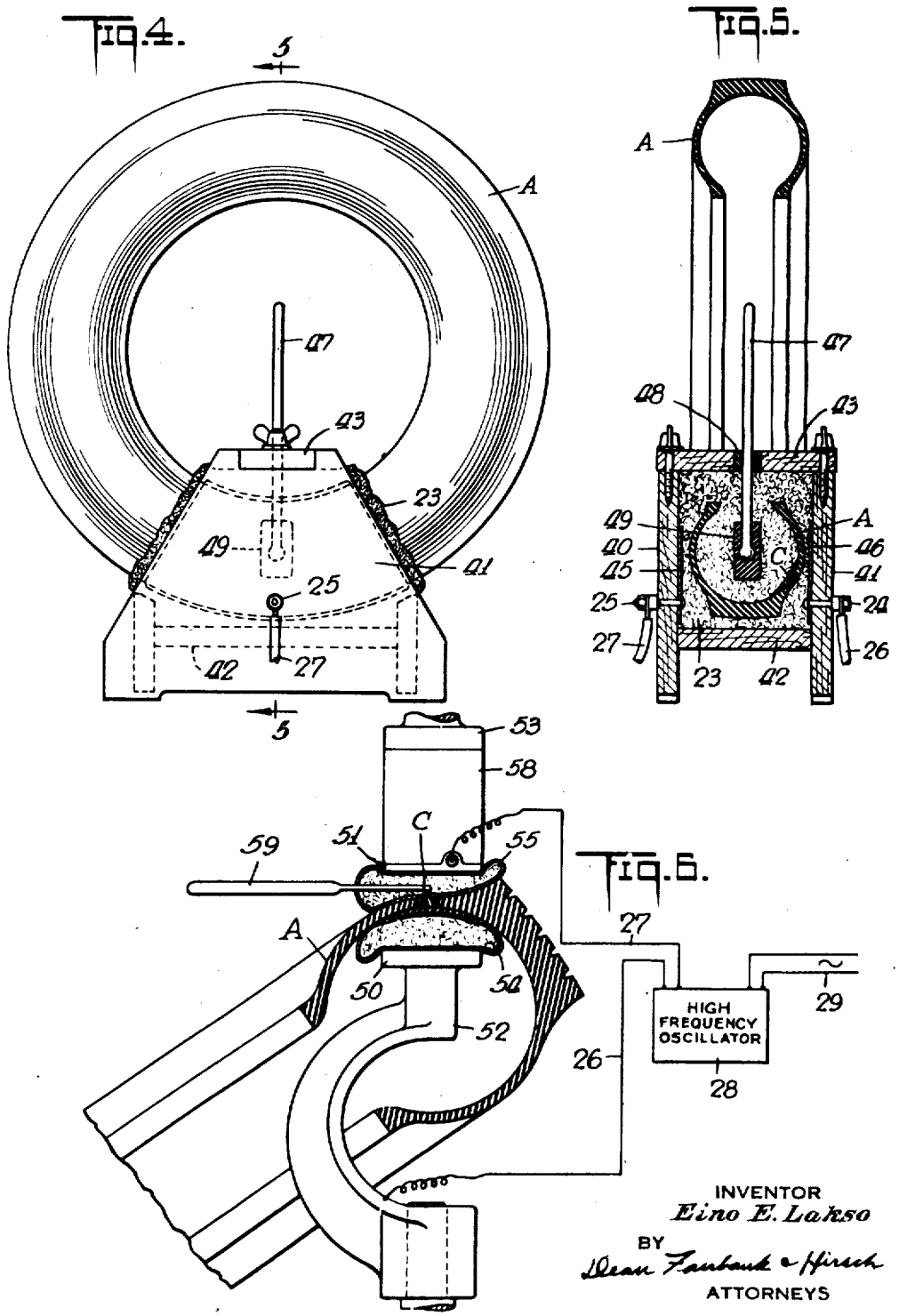

Patented May 27, 1947

2,421,097

UNITED STATES PATENT OFFICE 2,421,097

PROCESS AND APPARATUS FOR REPAIR OF TIRES

Eino E. Lakso, Fitchburg, Mass., assignor to Clarence W. Vogt, Norwalk, Conn.

Application October 28, 1943, Serial No. 507,940

3 Claims. (Cl. 18—18)

This invention relates to the repair of pneumatic tires by vulcanization, and by the term "repair" is included patching at holes, cuts or weakened places, and recapping, such as by applying a strip or band along the tread.

In the procedures heretofore employed the portion of the tire which is to be repaired is buffed or otherwise treated so as to remove injured or deteriorated material, and to present a relatively smooth surface. A soft, uncured rubber composition is applied and worked into place and into snug engagement with said surface, to build up the tire to the desired shape and size, and to fill any hole or cut in the tire. Heat and pressure are then applied to vulcanize the uncured or partially pre-cured rubber and permanently unite it to the body of the tire.

The heat and pressure are ordinarily that of steam, and this requires the use of a steam boiler and heavy and cumbersome parts for enclosing the tire. Such apparatus is not readily portable, the piping and joints often leak, and considerable delay is often incurred in developing the required steam pressure. Where steam is used as the heating medium a comparatively large expense is incurred in building up the necessary steam pressure, particularly when only one repair job is to be done. Furthermore, the heat and pressure are applied to areas far larger than those where the repair is to be made.

The main object of my invention is to provide a simple, comparatively light and readily portable unit for effecting the vulcanization, and in which there is no power consumption except during the vulcanizing action.

A further object is to provide a simple apparatus in which high frequency electrostatic heating may be employed in effecting the vulcanization, and in which the electrodes are so designed and arranged that they may be employed in connection with the repair of a tire of any size or shape, and at any location on the tire.

A further object is to provide an arrangement of electrodes presenting flat parallel surfaces, and between which the desired section of the tire may be held under pressure.

In carrying out my invention the electrodes are spaced apart in parallel planes and the necessary pressure applied to the tire between the electrodes is transmitted to the tire by the interposition of suitable filling material between the surfaces of the tire wall and the electrodes.

The unit employed for imparting to the electric current the desired frequency and other characteristics, may be of any well known type, such for instance as that on the market and known as "Thermex," and may be readily controlled to produce the degree of heat required.

In the drawings I have illustrated certain embodiments of my invention. In these drawings:

Fig. 1 is a section through an apparatus in which the tire may have a new tread or cap applied and vulcanized thereto.

Fig. 2 is a section similar to a portion of Fig. 1, but on a larger scale.

Fig. 3 is a section similar to Fig. 2, but showing an alternative construction.

Fig. 4 is a side elevation showing an apparatus for enclosing only a portion of the tire.

Fig. 5 is a section on the line 5—5 of Fig. 4, and

Fig. 6 is a section showing a further modification.

In the apparatus shown in Figs. 1 and 2 there is provided a box or casing having an annular chamber adapted to receive the tire. This casing may be formed of wood and include a base plate 10 with concentric annular walls 11 and 12 rigid therewith, and an annular cover plate 13 of a size and shape to loosely fit in the annular space between the walls 11 and 12. The base plate may be mounted on any suitable support 14, which if desired may be provided with a plunger 15 for raising or lowering the casing or the body thereof in respect to the cover plate. The cover plate is also shown as provided with a plunger rod 16 whereby the annular cover 13 may be forced downwardly into the chamber, and with the desired pressure. This type of apparatus is particularly designed for use in the applying of a new tread strip or cap to the tire, but may be employed for general repair work.

In preparing the tire A for vulcanization the outer or tread surface is cut, ground, buffed, or otherwise smoothed, a bonding cement is then applied, and the strip B of uncured rubber is pressed on to the tread. Such a strip, commonly called a "camelback" may have a smooth outer surface or may have grooves or kerfs formed in the outer surface in accordance with usual practice. The interior of the tire is then packed with a suitable filling material 17, which should have substantially the same dielectric property or constant as the rubber, and may be trimmings, buffings or small scraps of vulcanized rubber which have previously been removed from the tires in preparing them for repair. Such rubber chips or fragments are preferably mixed with talcum, which will prevent them from being vulcanized together, and permit of their repeated use. An inflatable tube 18 is then placed between the rim engaging beads of the tire, and the tire and tube are wrapped with a strip of substantially non-stretchable, non-metallic material to form a flexible casing 19. This wrapping may be spirally wound, as in the form of a puttee. The inflatable tube 18 is far smaller in diameter than the ordinary inner tube, and is of such size that it may extend to a short distance into the tire, as well as outside of it when inflated. The tube may be inflated through the ordinary type of valve stem 20, and when inflated will compress the filling material 17 and apply tension to the flexible casing 19 so as to hold the tread portion of the tire with its recapping strip of uncured rubber under pressure between the casing 19 and the casing 17a of the filler.

The wooden casing has an annular electrode 21 at the bottom thereof and a second annular electrode 22 secured to the inner side of the cover 13. The annular chamber is then partially filled with a loose filling material 23, and the tire placed in the casing. Additional filling material is then inserted so as to completely fill the chamber, and pressure is applied to bring the cover plate 13 and the base plate 10 toward each other so as to compress the filling material 23.

The two electrodes 21 and 22 have terminals 24 and 25 extending to the exterior sides of the casing, and to these terminals are connected the conductors 26 and 27 leading to the high frequency oscillator which may be enclosed in a box or casing 28. Current may be supplied to the high frequency oscillator by conductors 29, and may be from 1 to 50 megacycles and the input from ½ to 10 kw. I have not shown the details of the oscillator, as any suitable form well known in the art and used for high frequency electrostatic heating may be employed.

With the tire and apparatus assembled as above described, the current is turned on, and preferably with a higher kw. so as to bring the tire, the applied rubber and the apparatus rapidly up to the desired temperature, and thereafter at a lower kw., to effect the desired vulcanization of the uncured rubber, which may be at a temperature of about 280° or 290°.

In the construction illustrated the electrodes 21 and 22 extend substantially the full distance from the inner annular wall 11 to the outer annular wall 12, but where the apparatus is to be used only for retreading the tire the electrodes may be very much narrower, and may extend, for instance, only about one-third the distance from the outer wall toward the inner wall, so that the electrostatic field will include only the tread portion of the tire. If the apparatus is used primarily for the vulcanization of uncured rubber used in forming plugs, patches or repair areas on the side wall of the tire, then these electrodes need extend only through approximately the middle portion of the section between the walls 11 and 12. As the filling material inside of and outside of the tire has substantially the same dielectric property or constant as the rubber of the tire, the heating will be substantially uniform through the field.

As many types of tire have metal wires in the bead portion, and as such metal is a conductor of electricity, it will be noted that the inflatable tube which comes between the two beads is filled with air under pressure, and this air has a far higher resistance to the passage of the current than the tire or the filling material, and therefore acts as an insulation between the wires of the two tire beads.

In Fig. 3 I have shown a section somewhat similar to Fig. 2, but showing an alternative means of producing pressure against the inner and outer surfaces of the tire. In this form, instead of employing an annular cover plate 13 there is provided a circular plate 31 which engages a gasket 32 on the outer wall 12a, so that the entire annular chamber is hermetically sealed. This cover may have an annular groove 33 into which the upper edge of the inner wall 11 may extend. One of the walls, as for instance the outer wall 12a, is provided with a valve tube 34 to which may be connected a suitable source of pneumatic pressure, so that the entire chamber may be put under high air pressure, and this compressed air will act against the inner and outer surfaces of the tire and hold the strip of uncured rubber against the tread of the tire. It will similarly apply pressure to the inner and outer sides of any patch or plug C of uncured rubber which may be employed in filling and repairing a hole or cut in the wall of the tire.

Where the apparatus is designed only for the vulcanization of patches or plugs, instead of recapping, it is not essential that the whole tire be enclosed in a casing and held under pressure. In Figs. 4 and 5 there is shown an apparatus in which there is a small arcuate chamber having side walls 40 and 41, a bottom wall 42, and a top wall or cover 43. This chamber is open at both ends, and is of such size that a portion of the tire may be inserted therein after a hole or cut has been properly filled with a plug or patch of uncured rubber. Prior to or during the insertion of the tire in the casing the portion of the tire to be repaired is tightly packed with a filling material 23 of the character above referred to, and the space in the casing around the tire is likewise filled. After the cover 43 has been attached and secured in place, the filling material may be packed inwardly from opposite ends of the chamber and along the sides of the tire, and along the interior of the tire so as to firmly and tightly engage the opposite sides of the portion of the tire to be repaired.

The side walls 40 and 41 carry electrodes 45 and 46 which have suitable connections for the output terminals of the high frequency oscillator. In case it is desired to determine the temperature within the electrostatic field, a thermometer 47 or other suitable temperature indicating instrument, and preferably of non-metallic character, may be inserted through an aperture 48 in the cover 43. The bulb is disposed within the tire, and preferably carries a casing or block 49 of a material having substantially the same dielectric constant as the tire wall and the uncured rubber to be vulcanized.

It will be understood that the electrodes in the forms above described need not, and preferably do not, extend across the full width of the tire wall. They may be comparatively narrow, and disposed opposite to only the part to be vulcanized.

In Fig. 6 is shown a simple form of apparatus which is adapted only for making a sectional repair of holes or a spot repair of cuts or abrasions in the tire wall, and not for recapping or retreading. In this form there are two electrodes 50 and 51 presenting parallel flat surfaces, and of only a few inches width, but this width may be selected in accordance with the size of the tire to be repaired. The electrode 50 may be mounted upon or form a part of a suitable support 52 which may be curved so that a portion of a side wall of a tire may be brought into position over the upper surface of the electrode. The electrode 51 is preferably thin, and may be mounted on a suitable plunger 53 which may be raised and lowered, and may be pressed down toward the electrode 50. The plunger may carry a block of wood 58 or other insulating material between it and the electrode. As the electrodes are in parallel planes, and as the inner and outer surfaces of the tire are neither flat nor parallel, there are provided a pair of pads 54 and 55 for application to opposite sides of the tire wall. Each of these pads has a flexible casing so that it is deformable, and is filled with a material having substantially the same dielectric constant as the tire. It may be made up of small pieces of vulcanized rubber, or fine particles obtained from the previous cutting away of a tire in preparing the same for the insertion of the uncured rubber. It may also be plastic or other finely divided material. Dry sand has been found to be quite satisfactory as a filling material. As the casings of the two pads 54 and 55 are flexible and substantially non-stretchable, the plunger 53 in being forced downwardly toward the lower electrode will put the filling material under pressure, and will distort the casings of the filler pads so as to apply equal pressure over considerable portions of the area of the inner and outer surfaces of the wall.

The temperature at the area where the vulcanizing is to be effected may be noted or recorded by a thermometer 59, thermo-couple, or other suitable instrument. This may, if desired, have its inner end secured to the lower wall of the casing.

Here, as with the previous forms, the two electrodes are connected to the opposite terminals of the high frequency oscillator. By the term "connected" I include direct connection as well as indirect connection, as through a ground. For instance, the electrode 51 may be directly connected to the oscillator, and the electrode 50 and the other terminal of the oscillator grounded.

It will be noted that in each of the forms illustrated the electrodes present flat parallel surfaces, and filling material is employed between the two electrodes and the opposite sides of the portion of the tire to be repaired.

In the uncured rubber applied in making the repair there may be incorporated threads or cords as reinforcement, and in accordance with the usual practice in tire repair, and a patch or layer of the uncured rubber may be applied along the inner surface of the tire wall over an area somewhat larger than the portion filling the hole in said wall.

In a test of the type of apparatus shown in Fig. 6, highly satisfactory results were obtained by using approximately 500 watts at 4 to 5 megacycles for four minutes to bring the section of about six square inches up to vulcanizing temperature, and then 100 watts at 1 to 2 megacycles for ten minutes, for holding the temperature during the vulcanizing period.

The electrodes shown in Fig. 6 need not be in parallel flat planes, but may be in parallel arcuate planes. In that case the inner pad may be omitted if the curvature of the inner electrode approximates the normal curvature of the surface of the tire walls. It need not exactly conform to said curvature, as the tire wall may be somewhat flattened or curved to a somewhat greater extent by the pressure applied by the outer electrode. As the tire is supported primarily by the lower electrode in the construction shown in this figure, and as it is desirable that the supporting electrode be in a substantially horizontal plane, it will ordinarily be necessary to provide a pad between the inner electrode and the inner surface of the tire, and to make the support for the inner electrode curved as shown in the drawing, so that any desired part of the tire may be brought into position between the electrodes.

Having thus described my invention, what I claim as new and desire to secure by Letters Patent is:

1. The process of repairing a tire by vulcanizing uncured rubber thereto at the area requiring repair, which includes supporting said tire area between spaced flat electrodes presenting parallel surfaces of greater area than the area of the portion of the tire to be repaired, spacing said tire area from said electrodes by solid material which is in subdivided flowable form and which has substantially the same dielectric properties as the tire, subjecting said tire area to pressure, and producing between said electrodes a high frequency eelctrostatic field of sufficient heating effect to vulcanize said uncured rubber.

2. An apparatus for vulcanizing uncured rubber applied to an area of the tire in which the repair is to be effected, said apparatus including a pair of spaced electrodes presenting substantially parallel faces of greater area than the area of the portion of the tire to be repaired, filling material disposed on opposite sides of the area to be vulcanized and between said electrode faces, said material having substantially the same dielectric properties as the tire, means for subjecting said tire and filling material to pressure, and means connected to said electrodes for producing therebetween a high frequency electrostatic heating field.

3. An apparatus for vulcanizing uncured rubber applied to an area of the tire in which the repair is to be effected, said apparatus including a pair of spaced electrodes presenting substantially parallel faces of greater area than the area of the portion of the tire to be repaired, filling material disposed on opposite sides of the area to be vulcanized and between said electrode faces, said material having substantially the same dielectric properties as the tire, means for effecting relative movement of said electrodes toward each other to compress said filling material against said tire, and means connected to said electrodes for producing therebetween a high frequency electrostatic heating field.

EINO E. LAKSO.

REFERENCES CITED

The following references are of record in the file of this patent:

UNITED STATES PATENTS

| Number | Name | Date |
| --- | --- | --- |
| 1,162,397 | Price | Nov. 30, 1915 |
| 2,280,771 | Dufour et al. | Apr. 28, 1942 |
| 1,427,109 | Kasson | Aug. 29, 1922 |
| 1,467,761 | Jones, Jr. | Sept. 11, 1923 |
| 1,925,993 | Cassley et al. | Sept. 5, 1933 |
| 1,983,705 | Pilblad et al. | Dec. 11, 1934 |
| 2,032,222 | Norris | Feb. 25, 1936 |
| 2,327,761 | Glynn | Aug. 24, 1943 |
| 2,340,692 | Ridd | Feb. 1, 1944 |
| 2,347,952 | James | May 2, 1944 |
| 2,341,617 | Hull | Feb. 15, 1944 |